US009695939B2

(12) United States Patent
Tabata et al.

(10) Patent No.: US 9,695,939 B2
(45) Date of Patent: Jul. 4, 2017

(54) SEAL STRUCTURE OF FLUID DEVICE

(71) Applicant: IHI Corporation, Koto-ku (JP)

(72) Inventors: Hifumi Tabata, Tokyo (JP); Nobuhiko Yunoki, Tokyo (JP); Mitsutoshi Watanabe, Tokyo (JP); Hiroyuki Ochiai, Tokyo (JP); Eiji Hosoi, Tokyo (JP)

(73) Assignee: IHI Corporation, Koto-ku (JP)

( * ) Notice: Subject to any disclaimer, the term of this patent is extended or adjusted under 35 U.S.C. 154(b) by 193 days.

(21) Appl. No.: 14/573,944

(22) Filed: Dec. 17, 2014

(65) Prior Publication Data

US 2015/0104585 A1    Apr. 16, 2015

Related U.S. Application Data

(62) Division of application No. 13/509,503, filed as application No. PCT/JP2010/070182 on Nov. 12, 2010, now abandoned.

(30) Foreign Application Priority Data

Nov. 13, 2009  (JP) .................................. 2009-260169

(51) Int. Cl.
*F16J 15/32*    (2016.01)
*B29D 99/00*    (2010.01)
(Continued)

(52) U.S. Cl.
CPC ........ *F16J 15/324* (2013.01); *B29D 99/0053* (2013.01); *C23C 4/12* (2013.01);
(Continued)

(58) Field of Classification Search
CPC ............ B29D 99/0053; B29D 99/0085; B29L 2031/26–2031/265; C23C 26/00;
(Continued)

(56) References Cited

U.S. PATENT DOCUMENTS 4,257,735 A    3/1981  Bradley et al.
6,607,820 B2   8/2003  Niwa et al.
(Continued)

FOREIGN PATENT DOCUMENTS

EP    1 895 208 A1    3/2008
JP    1 158266        6/1989
(Continued)

OTHER PUBLICATIONS

Office Action issued Apr. 1, 2014, in Chinese Patent Application No. 2010800508748 (with English Translation).
(Continued)

*Primary Examiner* — Christopher Besler
*Assistant Examiner* — Matthew P Travers
(74) *Attorney, Agent, or Firm* — Oblon, McClelland, Maier & Neustadt, L.L.P.

(57) ABSTRACT

A seal structure includes: first and second members defining a hollow internal area of a fluid device; and a seal member fixed to the first member for sealing a gap between the first and second members. The seal member includes a sliding contact member being in sliding contact with a surface of the second member and formed of a resin. The second member includes a resin layer and a resin layer holding structure. The resin layer is formed by sliding the second member on the sliding contact member to transfer the resin forming the sliding contact member onto a sliding contact portion of the surface of the second member at which the second member comes into contact with the sliding contact member. The resin layer holding structure is a porous film formed by electric discharge surface treatment and holds the resin layer in the sliding contact portion.

7 Claims, 7 Drawing Sheets

(51) Int. Cl.
- *C23C 26/00* (2006.01)
- *F15B 15/14* (2006.01)
- *F16J 15/16* (2006.01)
- *B29L 31/26* (2006.01)
- *F16J 15/324* (2016.01)
- *C23C 4/12* (2016.01)
- *C23C 4/18* (2006.01)
- *F16J 15/328* (2016.01)

(52) U.S. Cl.
CPC ............... *C23C 4/18* (2013.01); *C23C 26/00* (2013.01); *F15B 15/1461* (2013.01); *F16J 15/162* (2013.01); *F16J 15/328* (2013.01); *B29L 2031/26* (2013.01); *F15B 2215/305* (2013.01); *Y10T 29/49281* (2015.01); *Y10T 29/49297* (2015.01)

(58) Field of Classification Search
CPC ........... F15B 2215/305; F15B 15/1461; Y10T 29/49297; Y10T 29/49281; F16J 15/162; F16J 15/324; F16J 15/328; F16J 15/3204; F16J 15/3232; F16J 15/3236; F16J 15/3268; F16J 15/3228; F16J 15/3256
See application file for complete search history.

(56) References Cited

U.S. PATENT DOCUMENTS

| | | | |
|---|---|---|---|
| 6,676,132 | B1 | 1/2004 | Takebayashi et al. |
| 7,014,438 | B2 * | 3/2006 | Fukuda ............... F01C 17/066 418/178 |
| 8,567,789 | B2 | 10/2013 | Ishida |
| 2002/0015839 | A1 | 2/2002 | Niwa et al. |
| 2008/0268564 | A1 | 10/2008 | Yasuno |
| 2010/0052262 | A1 | 3/2010 | Ishida |
| 2010/0276894 | A1 | 11/2010 | Jin et al. |
| 2014/0175756 | A1 | 6/2014 | Ikeda |

FOREIGN PATENT DOCUMENTS

| | | |
|---|---|---|
| JP | 2000 9106 | 1/2000 |
| JP | 2003 28092 | 1/2003 |
| JP | 2003 343491 | 12/2003 |
| JP | 2004 19782 | 1/2004 |
| JP | 2004 251376 | 9/2004 |
| JP | 2007 298152 | 11/2007 |
| JP | 2008 240067 | 10/2008 |
| WO | WO 2004/011696 A1 | 2/2004 |

OTHER PUBLICATIONS

International Search Report issued Dec. 7, 2010 in PCT/JP10/70182 Filed Nov. 12, 2010.

* cited by examiner

US 9,695,939 B2

SEAL STRUCTURE OF FLUID DEVICE

TECHNICAL FIELD

The present invention relates to a seal structure used in a fluid device.

BACKGROUND ART

Japanese Patent Application Publication No. 2003-343491 and Japanese Patent Application Publication No. 2003-28092 disclose seal structures which seal the gap between a housing and a rotary shaft of a water pump device by use of a packing. This packing includes an annular lip that comes into sliding contact with the outer circumferential surface of the rotary shaft.

Japanese Patent Application Publication No. 2004-19782 and Japanese Patent Application Publication No. 2000-9106 disclose seal structures which seal the gap between a cylinder body and a piston rod of a cylinder device by use of a packing. This packing includes an annular lip that comes into sliding contact with the outer circumferential surface of the piston rod.

SUMMARY OF INVENTION

Technical Problem

In the above conventional techniques, certain considerations are made on prevention of fast wear of the existing packing and damage thereon, and the like. However, not enough considerations are made on improvement in anti-leakage performance that is an essential requirement in the seal structures of the fluid devices. Thus, it has been difficult to further improve the performances of the seal structures.

The present invention has been made in view of the above problem, and an object thereof is to provide a seal structure of a fluid device capable of improving anti-leakage performance.

Solution to Problem

An aspect of the present invention is a seal structure of a fluid device comprising: a first member defining a hollow internal area of the fluid device; a second member defining the internal area together with the first member and being movable relative to the first member; and a seal member fixed to the first member and configured to seal a gap between the first member and the second member, wherein the seal member includes a sliding contact member being in sliding contact with a surface of the second member and formed of a resin, the second member includes a resin layer and a resin layer holding structure in a sliding contact portion of the surface of the second member at which the second member comes into sliding contact with the sliding contact member, the resin layer being formed by sliding the second member on the sliding contact member to transfer the resin forming the sliding contact member, the resin layer holding structure being configured to hold the resin layer in the sliding contact portion, and the resin layer holding structure is a porous film formed by causing electric discharge between a discharge electrode and the sliding contact portion of the surface of the second member and, by an energy of the electric discharge, depositing any one of a constituent material of the discharge electrode and a substance obtained by reaction of the constituent material onto the sliding contact portion.

BRIEF DESCRIPTION OF DRAWINGS

FIG. 1A is a view showing the configuration of a main portion of the seal structure, and FIG. 1B is an enlarged view of a portion B in FIG. 1A.

FIG. 5A is a view showing the whole configuration of the seal structure, and FIG. 5B is a view showing a method of forming a porous film in the seal structure.

FIG. 7A is a view showing the whole configuration of the seal structure, and FIG. 7B is a view showing a method of forming a porous film in the seal structure.

DESCRIPTION OF EMBODIMENTS

Figure 1A:
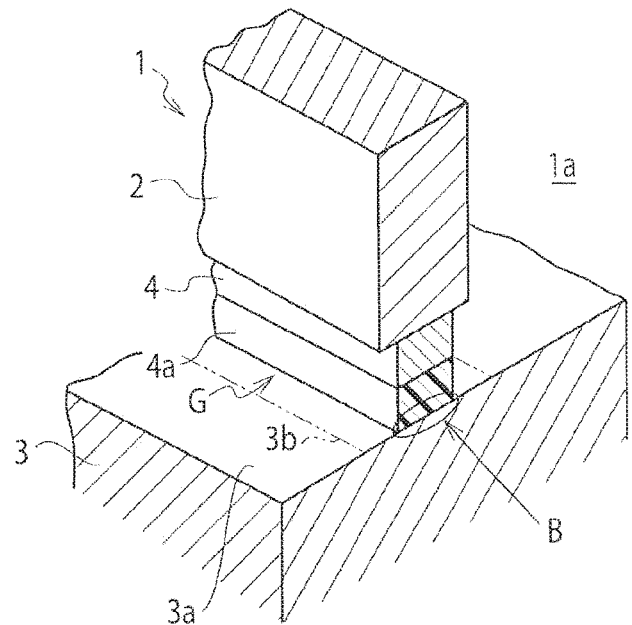
FIGS. 1A and 1B are cross-sectional views showing a seal structure of a fluid device of a first embodiment of the present invention.

Hereinbelow, preferred embodiments of the present invention will be described by referring to the drawings. The technical scope of the present invention shall be determined based on the description of the claims and is not limited only to the following embodiments. Note that in the description of the drawings, the same components are denoted by the same reference signs, and overlapping descriptions thereof are omitted. Moreover, the dimensional ratios in some drawings may be exaggerated for the sake of explanation and be different from the actual ratios. Further, "F" and "R" in some drawings refer to front and rear, respectively; however, these directions are defined for the sake of explaining the positional relationship between portions and are not at all related to the actual attachment postures of fluid devices and the like.

Meanwhile, in this description, fluid device is a collective term for devices that handle a fluid such as liquid, gas, or gas-liquid multiphase fluid, and includes fluid machines that handle a fluid and devices such as valves that control a fluid flow. The fluid machines include: various actuators that convert a fluid energy into a mechanical work, such as hydraulic motors, hydraulic cylinders; pumps, compressors, and fans that convert a mechanical work into a fluid energy; and the like. Also, the term "provide(d)" in this description means direct provision as well as indirect provision with an intermediate member or the like in between.

First Embodiment

A seal structure of a first embodiment of the present invention will be described by referring to FIGS. 1 to 4.

Figure 1B:
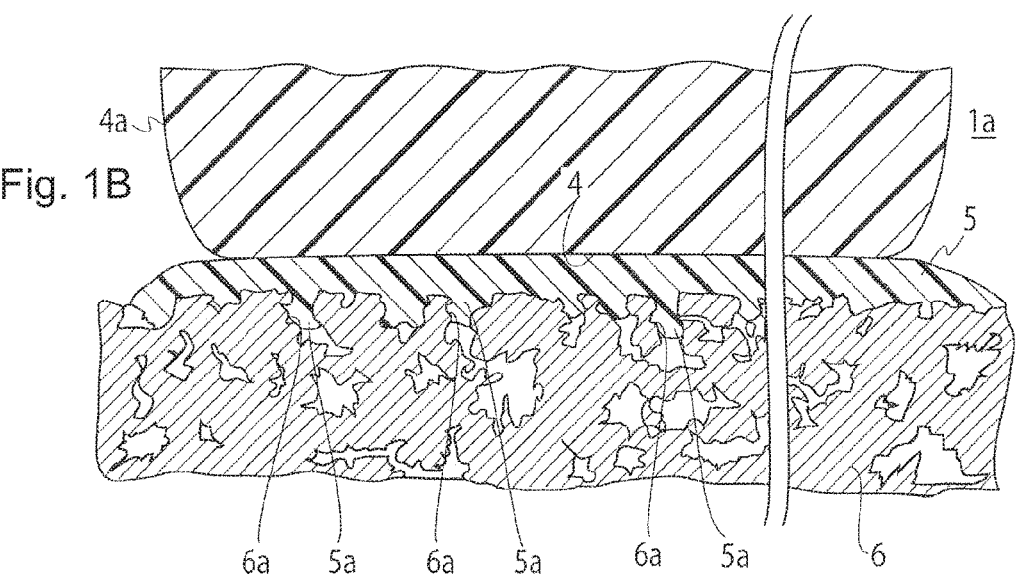

As shown in FIGS. 1A and 1B, a fluid device 1 of the first embodiment mainly includes a fixed member (first member) 3, a movable member (second member) 4, and a seal member 4.

The fixed member 2 and the movable member 3 together define a hollow internal area 1a of the fluid device 1. This hollow internal area 1a is a space which is sealed by the seal member 4 to be described later and in which a fluid is present temporarily or for a long period of time, such as a pressure chamber for holding the fluid under a desired pressure, a storage chamber for storing the fluid, or a passage through which the fluid flows.

The movable member 3 is a member capable of moving relative to the fixed member 2. The moving direction in the relative movement is not particularly limited and may be any direction as long as the dimension of a gap G formed between the fixed member 2 and the movable member 3 can be maintained substantially constant while the movable member 3 is moved relative to the fixed member 2.

The seal member 4 is fixed to the fixed member 2 and configured to seal the gap G between the fixed member 2 and the movable member 3. Note that "seal" means to reduce the leakage of the fluid in the internal area 1a of the fluid device 1 to the outside of the fluid device 1 through the gap G, to reduce the entry of foreign materials (including fluids) in the outside into the internal area 1a through the gap G, and so on.

The seal member 4 includes a sliding contact member 4a configured to slide on a surface 3a of the movable member 3 in movement of the movable member 3 relative to the fixed member 2. The shape of the sliding contact member 4a is not particularly limited. Besides the rectangular cross section shown in FIG. 1, the sliding contact member 4a may have a circular cross section, a U-shaped cross section, a V-shaped cross section, or a hollow cross section. Alternatively, the sliding contact member 4a may have a lip shape.

The sliding contact member 4a is formed of a resin. This resin can be selected from among various thermoplastic resins and thermosetting resins on the basis of the specification and application. Examples of the thermoplastic resins include polyamide (PA), polyacetal (POM), polyethylene terephthalate (PET), ultra-high-molecular-weight polyethylene (UHPE), polybutylene terephthalate (PBT), methylpentene (TPX), polyphenylene sulfide (PPS), polyimide (PI), polyether ether ketone (PEEK), liquid crystal polymers (LCP), polytetrafluoroethylene (PTFE), polyolefin-based resins, and the like. Examples of the thermosetting resins include phenolic resins (PF), polyether, and the like.

The resin forming the sliding contact member 4a is preferably a self-lubricating resin such as polyamide (PA), polyacetal (POM), polyphenylene sulfide (PPS), polyimide (PI), polyether ether ketone (PEEK), liquid crystal polymers (LCP), or polytetrafluoroethylene (PTFE), for example. The self-lubricating resin refers to a resin that has lubricating properties and shows a relatively low friction coefficient even without any solid or liquid lubricant added thereto.

The movable member 3 includes a resin layer 5 and a resin layer holding structure 6. The resin layer 5 is formed by sliding the movable member 3 on the sliding contact member 4a to transfer the resin forming the sliding contact member 4a onto a sliding contact portion 3b of the surface 3a at which the movable member 3 comes into sliding contact with the sliding contact member 4a. The resin layer holding structure 6 is configured to hold the resin layer 5 in the sliding contact portion 3b. Transfer refers to adhesion of wear debris (also referred to as transfer particles), produced from one of two members sliding on each other, to the surface of the other member.

The resin layer holding structure 6 is a porous film 6 formed by performing electric discharge surface treatment on the sliding contact portion 3b of the surface 3a of the movable member 3.

Figure 2:
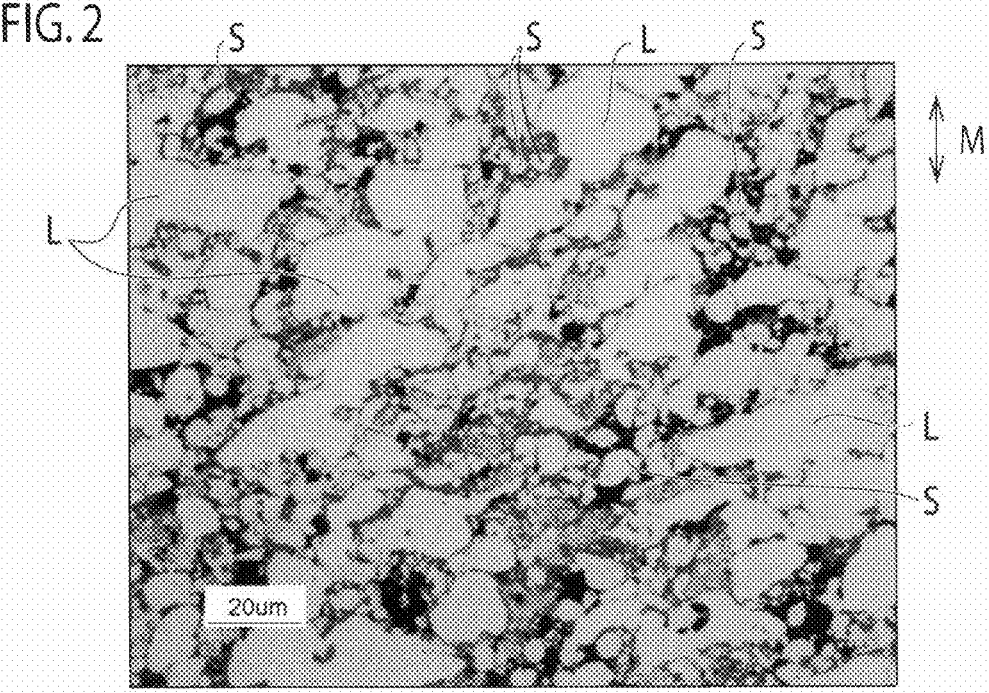
FIG. 2 is a SEM image capturing a cross section of a porous film in the seal structure in FIGS. 1A and 1B.

As shown in FIG. 2, the film 6 is a film in which relatively large particles L with maximum widths from approximately 20 to 50 μm and relatively small particles S with maximum widths from approximately 1 to 20 μm are accumulated and fixed randomly but uniformly (i.e., without local unevenness), and which therefore is homogeneously porous as a whole. Note that in FIG. 2, the arrow M shows the film thickness direction.

Figure 3:
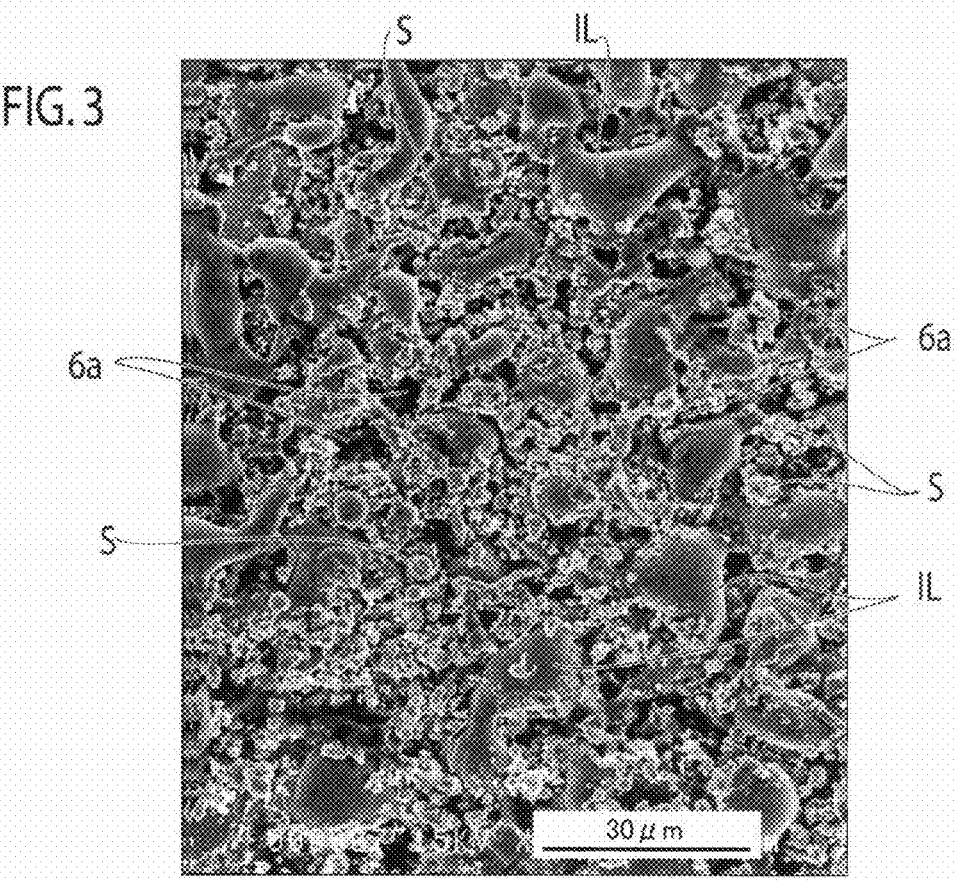
FIG. 3 is a SEM image capturing the outermost surface of the porous film in the seal structure in FIGS. 1A and B.

Thus, as shown in FIG. 3, at the outermost surface of the film 6, the outermost ends of relatively large particles L appear as island portions IL with maximum widths from approximately 1 to 20 μm having relatively smooth surfaces. In recesses with widths from approximately 5 to 40 μm and depths from approximately 5 to 30 μm formed between the island portions IL, a number of relatively small particles S are accumulated randomly while leaving gaps therebetween, and are fixed to the surfaces of the island portions IL or to other small particles S. At the outermost surface of the film 6, the gaps between the island portions IL and the small particles S and the gaps between the small particles S appear as a number of fine grooves or pores 6a with random shapes (see FIG. 1). As compared to the island portions IL, the small particles S defining the grooves or pores 6a have random polygonal shapes having a number of angular portions on the surfaces thereof.

In other words, the outermost surface of the film 6 is formed of relatively large island portions IL, a number of small particles S scattered therebetween, and a number of fine grooves or pores 6a formed therebetween. Thus, as a sliding surface, the outermost surface is a relatively rough (high in surface roughness). Note that the surface of the film 6 is preferably subjected to polishing at least once for the purpose of reducing excessive wear of the sliding contact member 4a that comes into sliding contact therewith.

The porosity of the film 6 is not particularly limited and may be set suitably on the basis of the material of the resin layer 5 held by the film 6. The porosity, however, is preferably set to 5 to 60% in order for the film 6 to secure a suitable resin holding power as a resin layer holding structure. Moreover, the porosity is more preferably set to 5 to 30%, and even more preferably to 10 to 15% in order to increase the strength of the film 6. Note that the porosity can be measured by Archimedes' method (JIS-R-1634).

The widths or diameters of grooves or pores 6a formed in the outermost surface of the film 6 are not particularly limited but are preferably within a range from 0.01 μm to 10 μm in a plan view of the outermost surface of the film 6. Note that the widths or diameters of the grooves or pores 6a can be calculated based on the dimensions of the outermost surface of the film 6 in a microscopic image and on the magnification of the microscope.

The electric discharge surface treatment refers to surface treatment in which electric discharge is caused between a discharge electrode and a workpiece (base material) in a working liquid such as an electrically insulative oil or in the air, and by the discharge energy, a wear-resistant film made of the material of the electrode or a substance obtained by reaction of the material of the electrode with the discharge energy is formed on the treatment surface of the workpiece.

Figure 4:
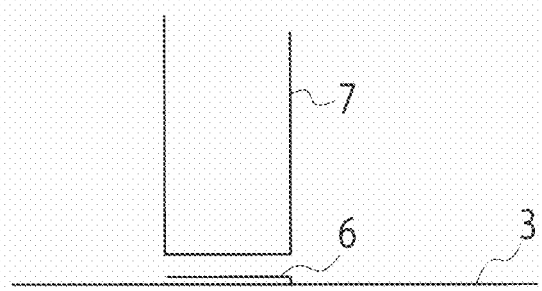
FIG. 4 is a view showing a method of forming the porous film in the seal structure in FIGS. 1A and 1B.

In this embodiment, as shown in FIG. 4, the porous film 6 is formed by causing pulse discharge using a discharge electrode 7 in an electrically insulative working liquid or in the air, the discharge electrode 7 having a leading end with a width substantially equal to the width of the sliding contact portion 3b of the movable member 3. The pulse discharge is caused between the discharge electrode 7 and the sliding contact portion 3b of the surface 3a of the movable member 3 while moving the movable member 3 relative to the discharge electrode 7. By the discharge energy, the constituent material of the discharge electrode 7 or a substance obtained by reaction of the constituent material is deposited on the sliding contact portion 3b.

Here, the discharge electrode 7 is a green compact electrode (including heat-treated green compact electrode) obtained by compression molding or injection molding of a metal powder, a metal compound powder, a ceramic powder, or a mixed powder thereof.

Examples of the metal powder include powders of alloys such as a Stellite alloy, an iron-based alloy, a nickel (Ni) alloy, and a cobalt (Co) alloy and powders of pure metals such as iron (Fe), cobalt (Co), nickel (Ni), copper (Cu), chromium (Cr), molybdenum (Mo), and titanium (Ti).

The Stellite (a registered trademark of Deloro Stellite Company) alloy is an alloy essentially containing cobalt, and consisting of chromium, nickel, tungsten, and the like. Typical examples of the Stellite alloy include Stellite 1, Stellite 3, Stellite 4, Stellite 6, Stellite 7, Stellite 12, Stellite 21, Stellite F, and the like.

Examples of the iron-based alloy include an alloy essentially containing iron and nickel, an alloy essentially containing iron, nickel, and cobalt, an alloy essentially containing iron, nickel, and chromium, and the like. Examples of the alloy essentially containing iron, nickel, and chromium include a stainless steel, typical examples of which include SUS304, SUS316, and the like specified by the Japanese Industrial Standards.

Examples of the nickel alloy include Hastelloy (a registered trademark of Haynes International Inc.) alloys, Inconel (a registered trademark of Special Metals Corporation) alloys, Incoloy (a registered trademark of Special Metals Corporation) alloys, Monel (a registered trademark of Special Metals Corporation) alloys, Nimonic (a registered trademark of Special Metals Corporation) alloys, RENE (a registered trademark of Teledyne Industries Inc.) alloys, UDIMET (a registered trademark of Special Metals Corporation) alloys, WASPALOY (a registered trademark of United Technologies Corporation) alloy, and the like.

Examples of the cobalt alloy include a Stellite-based alloy, a Tribaloy-based alloy (Tribaloy T400 or T800 (Tribaloy is a registered trademark of Deloro Stellite Company)), UDIMET700 (a registered trademark of Special Metals Corporation), and the like.

Note that the discharge electrode 7 is preferably molded out of powder of an alloy containing a carbonization-resistant metal by 60% or higher, such for example as powder of a cobalt alloy containing chromium, for the purpose of securing a sufficient film thickness of the porous film 6. The carbonization-resistant metal is cobalt, nickel, iron, or the like.

Examples of the metal compound and the ceramic include cubic boron nitride (cBN), titanium carbide (TiC), titanium nitride (TiN), titanium aluminium nitride (TiAlN), titanium diboride ($TiB_2$), tungsten carbide (WC), chromium carbide ($Cr_3C_2$), silicon carbide (SiC), zirconium carbide (ZrC), vanadium carbide (VC), boron carbide ($B_4C$), silicon nitride ($Si_3N_4$), zirconium oxide ($ZrO_2$), alumina ($Al_2O_3$), and the like. The discharge electrode 7 may be molded out of a mixed powder in which powder of at least one of these is added to the aforementioned metal powder. In this way, the wear resistance of the porous film 6 can be enhanced.

The discharge condition for the pulse discharge in the electric discharge surface treatment can be set suitably on the basis of the material of the discharge electrode 7, the properties of the base material of the movable member 3, the thickness and porosity of the film 6, and the like. The discharge condition is usually set within a range where the peak current is not lower than 1 A but not higher than 30 A and the pulse width is not shorter than 1 μs but not longer than 200 μs. Note that the discharge condition is preferably set such that the peak current is not lower than 5 A but not higher than 20 A and the pulse width is not shorter than 2 μs but not longer than 20 μs, for the purpose of reducing the damage on the base material of the movable member 3 and also increasing the bond strength of the film 6.

The resin layer 5 is formed by sliding the movable member 3 on the seal member 4 to transfer the resin forming the sliding contact member 4a onto the sliding contact portion 3b of the surface 3a of the movable member 3. Specifically, the resin layer 5 is formed by the following processes (1) to (4).

(1) The sliding contact member 4a is brought into elastic contact with the surface of the porous film 6 formed in the sliding contact portion 3b of the surface 3a of the movable member 3. As the movable member 3 moves relative to the fixed member 2 from this state, the sliding contact member 4a slides on the surface of the film 6 at a surface pressure determined by the elasticity of the sliding contact member 4a, the pressure on the sealed fluid, and the like.

(2) In this event, at the frictional interface between the sliding contact member 4a and the film 6, part of the resin forming the sliding contact member 4a becomes unable to withstand the shear force produced by the friction, and is separated from the sliding contact member 4a and thereby becomes transfer particles.

(3) The transfer particles of the resin separated from the sliding contact member 4a are captured in a number of grooves or pores 6a formed in the outermost surface of the film 6 and adhere to the surface of the film 6.

(4) As the movement of the movable member 3 relative to the fixed member 2 (the sliding of the movable member 3 on the seal member 4) continues, the series of processes from the separation to the adhesion of the resin is performed repeatedly, so that the resin particles transferred to the film 6 are bonded to each other and grow larger. Then, the bonded resin particles are further supplied with and bonded to the transfer particles to grow larger in the film thickness direction, and also enter the grooves or pores 6a in the film 6 (part of the bonded resin particles fills some of the grooves or pores 6a) as shown in FIG. 1.

As a result, in the sliding contact portion 3b of the surface 3a of the movable member 3, the resin layer 5 made of the resin forming the sliding contact member 4a (including the substance obtained by reaction of the resin) is formed in such a way as to cover entirely or partially the portion of the surface of the film 6 that has been in sliding contact with the sliding contact member 4a.

At the interface between the resin layer 5 and the film 6, a number of anchor portions 5a are formed which are fitted in the grooves or pores 6a in the film 6. As mentioned above, the grooves or pores 6a are defined by a number of small particles S having random polygonal shapes having a number of angular portions at the surfaces thereof. These small particles S penetrate the anchor portions 5a of the resin layer 5 to hold the resin layer 5.

Now, operations and effects of the first embodiment will be described.

In general, fluid devices are designed as follows if sealing is to be done by setting a resin seal member in sliding contact with the surface of a movable member. Specifically, the surface roughness of the portion of the surface of the movable member in sliding contact with the seal member is made as low as possible to achieve a larger real contact area between the sliding contact portion and the seal member. The real contact area refers to the area of the actually contacting portions (real contact spots) of two contacting surfaces.

It is possible that the fluid, or the object to be sealed, is vaporized by the frictional heat produced by the friction between the movable member and the seal member (e.g., turning into water vapor in a case where the fluid is water), especially when the speed of the movement of the movable member relative to the fixed member is high, and therefore the speed of the sliding of the movable member on the seal member is high. To reduce the leakage of the vaporized fluid to the outside, the portion of the surface of the movable member in sliding contact with the seal member is formed of a dense material, and the surface roughness thereof is set to the lowest possible value. Meanwhile, there are cases where a hard film is provided on the surface of the movable member to enhance the wear resistance of the surface. In such cases too, the hard film is formed of a dense material, and the surface roughness thereof is set to the lowest possible value.

Now, suppose a case of operating a fluid device designed based on the above idea. As the seal member slides on the surface of the movable member and wears, part of the resin forming the seal member becomes particles and is separated from the seal member. However, the surface roughness of the surface of the movable member is low as mentioned above, and its power to hold the resin particles is not sufficient either. Thus, the separated resin particles may once adhere to the surface of the movable member but will be separated therefrom immediately. Consequently, the resin particles are left unfixed at the frictional interface between the seal member and the movable member. For this reason, the above fluid device has a difficulty in maintaining a large real contact area between the surfaces of the seal member and movable member.

In the seal structure of the fluid device of this embodiment, the movable member 3 includes: the resin layer 5; and the resin layer holding structure 6 in the sliding contact portion 3b of the surface 3a of the movable member 3 at which the movable member 3 comes into sliding contact with the sliding contact member 4a of the seal member 4, the resin layer 5 being formed by sliding the movable member 3 on the sliding contact member 4a to transfer the resin forming the sliding contact member 4a, the resin layer holding structure 6 being configured to hold the resin layer 5 in the sliding contact portion 3b. Accordingly, at the frictional interface between the movable member 3 and the sliding contact member 4a, the resin layer 5 formed of the resin forming the sliding contact member 4a slides on the sliding contact member 4a, and the two resins come into tight contact with each other. Thus, a large real contact area is maintained therebetween, improving the anti-leakage performance of the seal structure.

Moreover, the resin layer holding structure 6 is the porous film 6 formed by electric discharge surface treatment, and includes at its outermost surface relatively large island portions IL, a number of small particles S scattered therebetween, and a number of fine grooves or pores 6a formed therebetween. Thus, when the resin layer 5 is formed by sliding the movable member 3 on the sliding contact member 4a to transfer the resin forming the sliding contact member 4a onto the film 6, the anchor portions 5a fitted in the grooves or pores 6a are formed at the interface with the film 6 of the resin layer 5. Because the small particles S defining the grooves or pores 6a have random polygonal shapes having a number of angular portions at the surfaces thereof, the small particles S penetrate the anchor portions 5a. This allows the resin layer 5 to be held securely and firmly in the sliding contact portion 3b of the movable member 3 by the film 6.

Further, in the seal structure of this embodiment, a suitable material is selected for the discharge electrode 7 which is used for the electric discharge surface treatment. Specifically, the discharge electrode 7 may be molded out of, for example, a mixed powder in which at least one of powders of cBN, hBN, TiC, TiN, TiAlN, TiB$_2$, WC, Cr$_3$C$_2$, SiC, ZrC, VC, B$_4$C, Si$_3$N$_4$, ZrO$_2$, and Al$_2$O$_3$ is added to powder of an alloy containing a carbonization-resistant metal by 60% or higher. In this way, the wear resistance of the film 6 can be enhanced. This makes it possible to improve the anti-leakage performance while securing a wear resistance (the wear resistance of the sliding contact member 4a and the wear resistance of the movable member 3) that is substantially the same as those of films formed by some other, typical surface treatment methods. There is a demand, especially in recent years, for a further improvement in the performance of the seal structure due to increase in the speed and pressure of fluid devices. With the seal structure of this embodiment, it is possible to sufficiently fulfill such a demand.

Note that although the seal member 4 is fixed to the fixed member 2 in this embodiment, the seal member 4 may be fixed to the movable member 3. In this case, the sliding contact member 4a of the seal member 4 may be set in sliding contact with the surface of the fixed member 2, and a resin layer and a resin layer holding structure may be formed in a sliding contact portion of the fixed member 2. Moreover, the shape of the sliding contact portion 3b of the movable member 3 is not particularly limited. Besides the flat shape shown in FIG. 1, a curved shape which is convex or concave toward the fixed member 2 may be employed.

To evaluate the anti-leakage performance of the seal structure of this embodiment, a leakage test was conducted by using films formed by other typical surface treatment methods and the film of this embodiment. The test condition was as follows: water was used as the fluid; the sliding speed on the sliding surface was 10 m/s; the pressure on the sealed fluid was 10 kPaG; and the amount of leakage per 100 hours was measured. Table 1 shows the obtained results.

|  | Amount of Leakage | Amount of Wear of Sliding Contact Member | Surface Roughness Ra [μm] |
| --- | --- | --- | --- |
| Comparative Example 1 (Film A formed by thermal spraying) | 100% | 100% | 0.05 to 0.10 |
| Comparative Example 2 (Film B formed by thermal spraying) | 170% | 125% | 0.04 to 0.10 |
| Comparative Example 3 (Film C formed by vapor deposition) | 1253% | 100% | 0.07 to 0.12 |

-continued

|  | Amount of Leakage | Amount of Wear of Sliding Contact Member | Surface Roughness Ra [μm] |
|---|---|---|---|
| Comparative Example 4 (DLC film) | 73% | 200% | 0.16 to 0.17 |
| Example 1 (MSC film) | 20% | 150% | 0.15 to 0.18 |

In Table 1, Comparative Examples 1 and 2 correspond to films formed by thermal spraying, Comparative Example 3 corresponds to a film formed by vapor deposition, Comparative Example 4 corresponds to a diamond-like carbon film, and Example 1 corresponds to the porous film of this embodiment formed by the electric discharge surface treatment. No sealing treatment was performed on any of the films, but polishing was performed once on each of the films. Note that the amount of leakage and the amount of wear of the sliding contact member were evaluated by using those of Comparative Example 1 as references (100%). Surface roughness refers to an arithmetic mean of roughness specified by the Japanese Industrial Standards (JIS-B-0601: 2001).

From Table 1, it is found that the amount of leakage in Example 1 is significantly improved as compared to those in Comparative Examples 1 to 4 (improved down to 20% of the reference value). As for the amount of wear of the sliding contact member, it is found that the amount of wear in Example 1 is substantially the same as those in Comparative Examples 1 to 4. Note that the material of each sliding contact member used in this test is PTFE. Though not shown in Table 1, the amount of wear of the film serving as the counterpart of the sliding contact member was measured in this test as well. It is found that the amount of wear of the film in Example 1 is substantially the same as those in Comparative Examples 1 to 4.

It is also found that the amount of leakage in Example 1 is reduced to be smaller than 1/3 of that in Comparative Example 4 which has substantially the same level of surface roughness. The above shows that the porous film formed by the electric discharge surface treatment can exhibit an excellent resin holding power due to its unique structure.

Second Embodiment

A seal structure of a fluid device of a second embodiment of the present invention will be described by referring to FIG. 5A, FIG. 5B, and FIG. 6. This embodiment is an example applying the seal structure of the first embodiment to a rotary machine.

Figure 6:
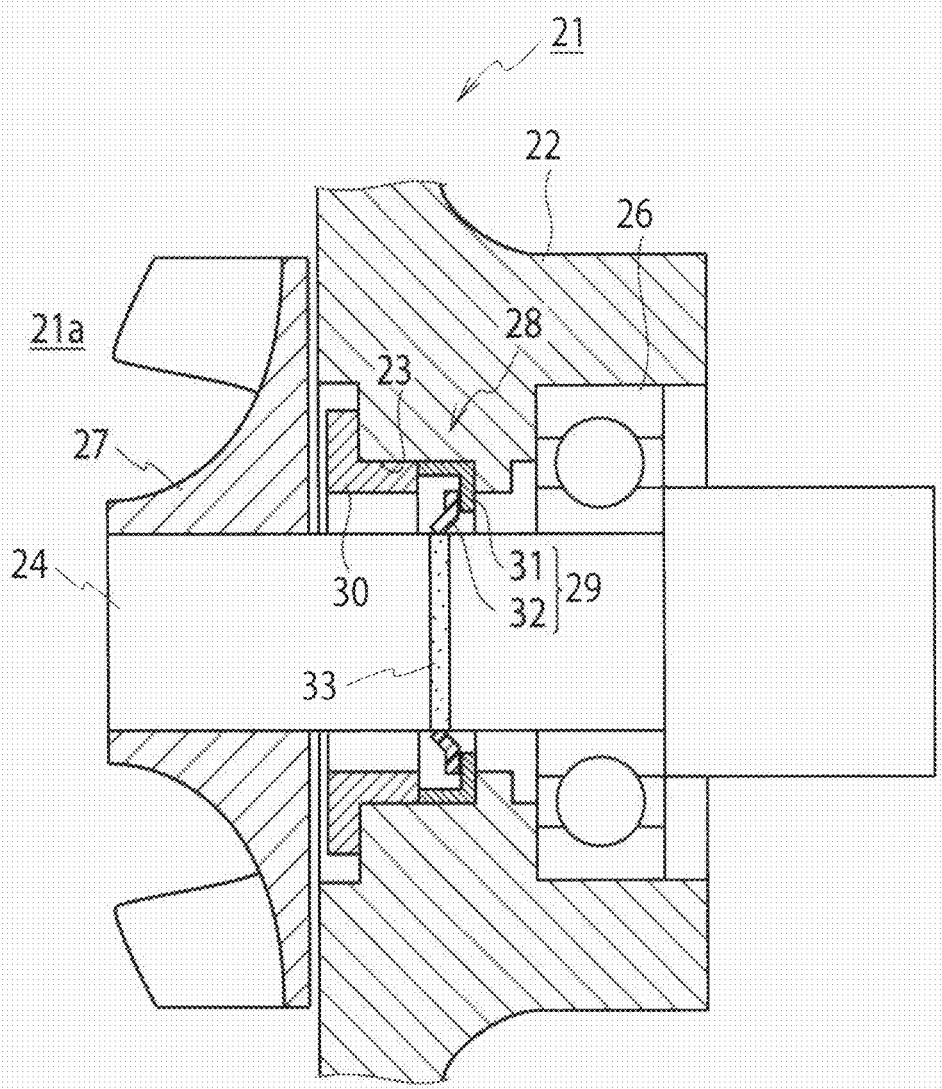
FIG. 6 is a cross-sectional view showing a main portion of the water pump of the second embodiment of the present invention.

As shown in FIG. 6, a water pump (an example of the rotary machine) 21 of the second embodiment includes a housing (pump body) 22 defining a pump chamber 21a of the water pump 21 and a rotary shaft 24 defining the pump chamber 21a together with the housing 22.

A through-hole 23 is formed in the housing 22 in a suitable position, and the rotary shaft 24 penetrates therethrough. The rotary shaft 24 is provided to be rotatable relative to the housing 22 through a bearing 26. A front end side (one end side) of the rotary shaft 24 extends to the inside of the pump chamber 21a in the housing 22. An impeller 27 provided inside the pump chamber 21a is integrally attached to this front end portion (one end portion). A rear end side (the other end side) of the rotary shaft 24 extends to the outside of the housing 22. This rear end portion (the other end portion) is coupled to an output shaft (unillustrated) of a rotary motor (unillustrated).

By rotating the rotary shaft 24 with the drive of the rotary motor, the water pump 21 configured as above can rotate the impeller 27 together with the rotary shaft 24 and thereby pump the water inside the housing 22.

The water pump 21 of this embodiment includes a seal structure (rotary machine seal structure) 28 configured to seal the gap between the inner circumferential surface of the through-hole 23 in the housing 22 and the rotary shaft 24 to reduce the leakage of water from the housing 22.

Figure 5A:
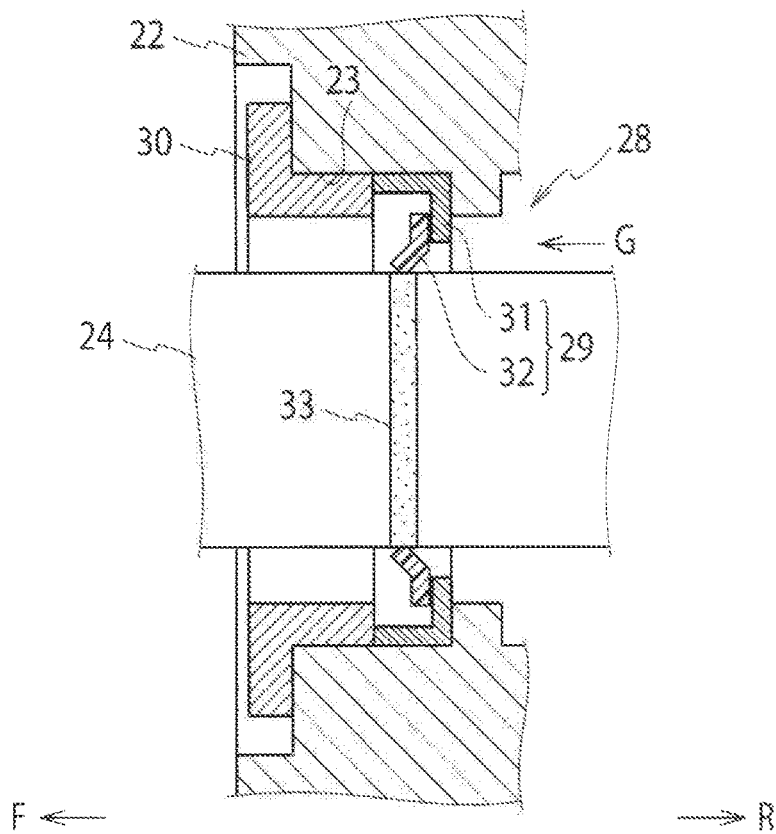
FIGS. 5A and 5B are views showing a seal structure of a fluid device of a second embodiment of the present invention.
Figure 5B:
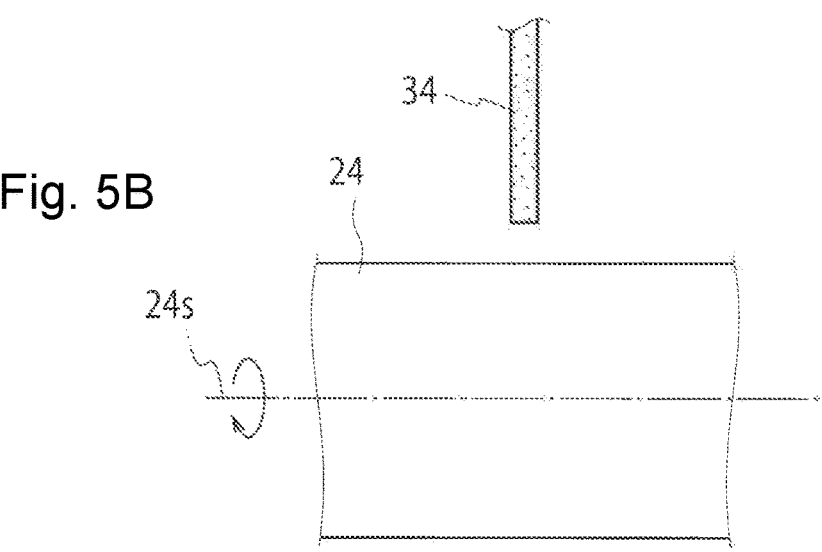

As shown in FIG. 5A, the rotary machine seal structure 28 includes a packing 29 fixed to the inner circumferential surface of the through-hole 23 in the housing 22 through an annular packing gland 30 and configured to seal a gap G between the housing 22 and the rotary shaft 24.

The packing 29 includes an annular core 31 and a lip 32 provided integrally with the core 31 and being in sliding contact with the outer circumferential surface of the rotary shaft 24. The lip 32 is formed of a self-lubricating resin such as PTFE while the core 31 is formed of a metal such as stainless steel. Note that the packing 29 may be formed of a self-lubricating resin only.

The rotary shaft 24 includes: a resin layer 5 (see FIG. 1) formed by sliding the rotary shaft 24 on the lip 32 to transfer the resin forming the lip 32 onto a sliding contact portion of the outer circumferential surface of the rotary shaft 24 at which the rotary shaft 24 comes into sliding contact with the lip 32; and a resin layer holding structure 33 configured to hold the resin layer 5 in the sliding contact portion of the rotary shaft 24.

The resin layer holding structure 33 is a porous, hard film 33 formed by performing electric discharge surface treatment on the sliding contact portion of the outer circumferential surface of the rotary shaft 24 at which the rotary shaft 24 comes into sliding contact with the lip 32. More specifically, as shown in FIG. 5B, the hard film 33 is formed by causing pulse discharge using a rod-shaped discharge electrode 34 in an electrically insulative working liquid or in the air. The pulse discharge is caused between the discharge electrode 34 and the sliding contact portion of the outer circumferential surface of the rotary shaft 24, which is a component of the water pump 21, while rotating the rotary shaft 24 about its axis 24s. By the discharge energy, the constituent material of the discharge electrode 34 or a substance obtained by reaction of the constituent material is deposited on the sliding contact portion of the outer circumferential surface of the rotary shaft 24. Meanwhile, the surface of the hard film 33 is subjected to polishing.

Here, the discharge electrode 34 is molded out of powder of an alloy containing a carbonization-resistant metal by 60% or higher. To enhance the wear resistance of the hard film 33, the discharge electrode 34 may be molded out of a mixed powder in which at least one of powders of cBN, hBN, TiC, TiN, TiAlN, $TiB_2$, WC, $Cr_3C_2$, SiC, ZrC, VC, $B_4C$, $Si_3N_4$, $ZrO_2$, and $Al_2O_3$ is added to the above alloy powder.

Now, operations and effects of the second embodiment will be described.

The seal structure of the fluid device of this embodiment includes: the resin layer 5 formed by sliding the rotary shaft 24 on the lip 32 to transfer the resin forming the lip 32 onto the sliding contact portion of the outer circumferential surface of the rotary shaft 24 at which the rotary shaft 24 comes into sliding contact with the lip 32; and the resin layer holding structure 33 configured to hold the resin layer 5 in the sliding contact portion. Accordingly, like the first embodiment, at the frictional interface between the rotary shaft 24 and the lip 32, the resin layer 5 formed of the resin forming the lip 32 slides on the lip 32, and the two resins come into tight contact with each other. Thus, a large real contact area is maintained therebetween, improving the anti-leakage performance of the seal structure.

Moreover, the resin layer holding structure 33 is the porous hard film 33 formed by electric discharge surface treatment and, like the first embodiment, includes at its outermost surface relatively large island portions IL, a number of small particles S scattered therebetween, and a number of grooves or pores 6a formed therebetween (see FIGS. 1 and 3). Thus, when the resin layer 5 is formed by sliding the rotary shaft 24 on the lip 32 to transfer the resin forming the lip 32 onto the hard film 33, anchor portions 5a (see FIG. 1) fitted in the grooves or pores 6a in the hard film 33 are formed at the interface with the film 6 of the resin layer 5. Because the small particles S defining the grooves or pores 6a have random polygonal shapes having a number of angular portions at the surfaces thereof, the small particles S penetrate the anchor portions 5a. This allows the resin layer 5 to be held securely and firmly in the sliding contact portion of the rotary shaft 24 by the hard film 33.

Further, in the seal structure of this embodiment, the discharge electrode 34 used in the electric discharge surface treatment may be molded out of a mixed powder in which at least one of powders of cBN, hBN, TiC, TiN, TiAlN, $TiB_2$, WC, $Cr_3C_2$, SiC, ZrC, VC, $B_4C$, $Si_3N_4$, $ZrO_2$, and $Al_2O_3$ is added to powder of the alloy which is the material of the discharge electrode 34. In this way, the wear resistance of the hard film 33 can be enhanced further. This makes it possible to improve the anti-leakage performance while securing a wear resistance that is substantially the same as those of films formed by some other, typical surface treatment methods.

Thus, according to the second embodiment, the anti-leakage performance of the rotary machine seal structure 28 is enhanced, making it possible to further improve the performance of the rotary machine seal structure 28.

Third Embodiment

A seal structure of a fluid device of a third embodiment of the present invention will be described by referring to FIG. 7A, FIG. 7B, and FIG. 8. This embodiment is an example applying the seal structure of the first embodiment to a reciprocating machine.

Figure 7A:
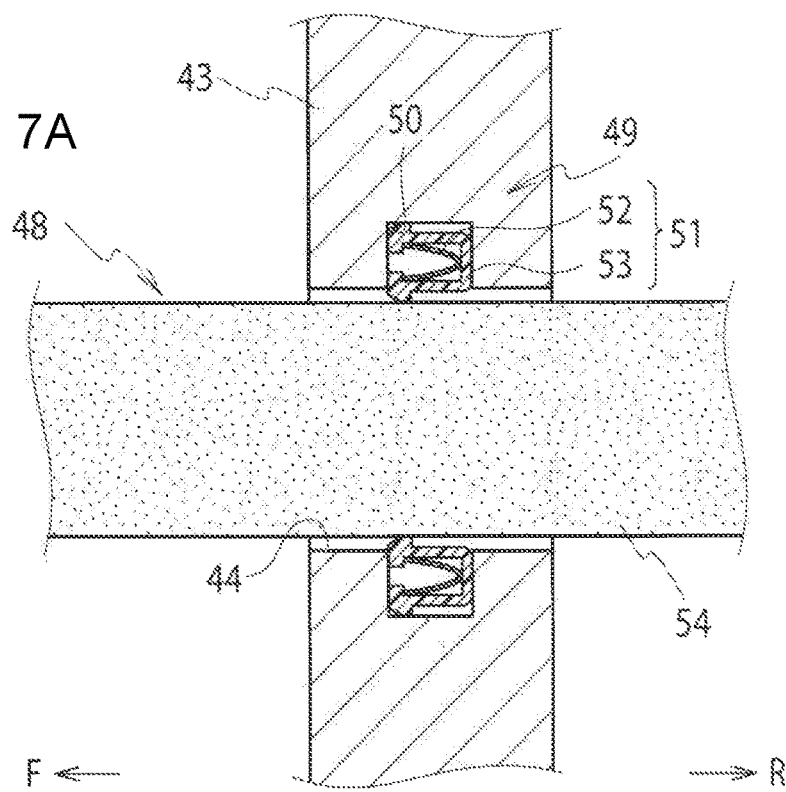
FIGS. 7A and 7B are views showing a seal structure of a fluid device of a third embodiment of the present invention.
Figure 7B:
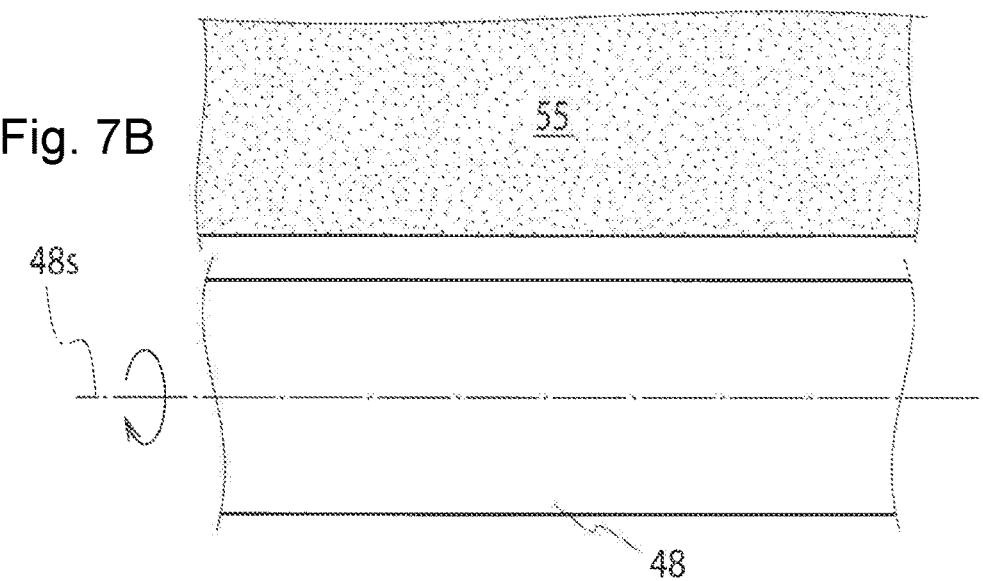
Figure 8:
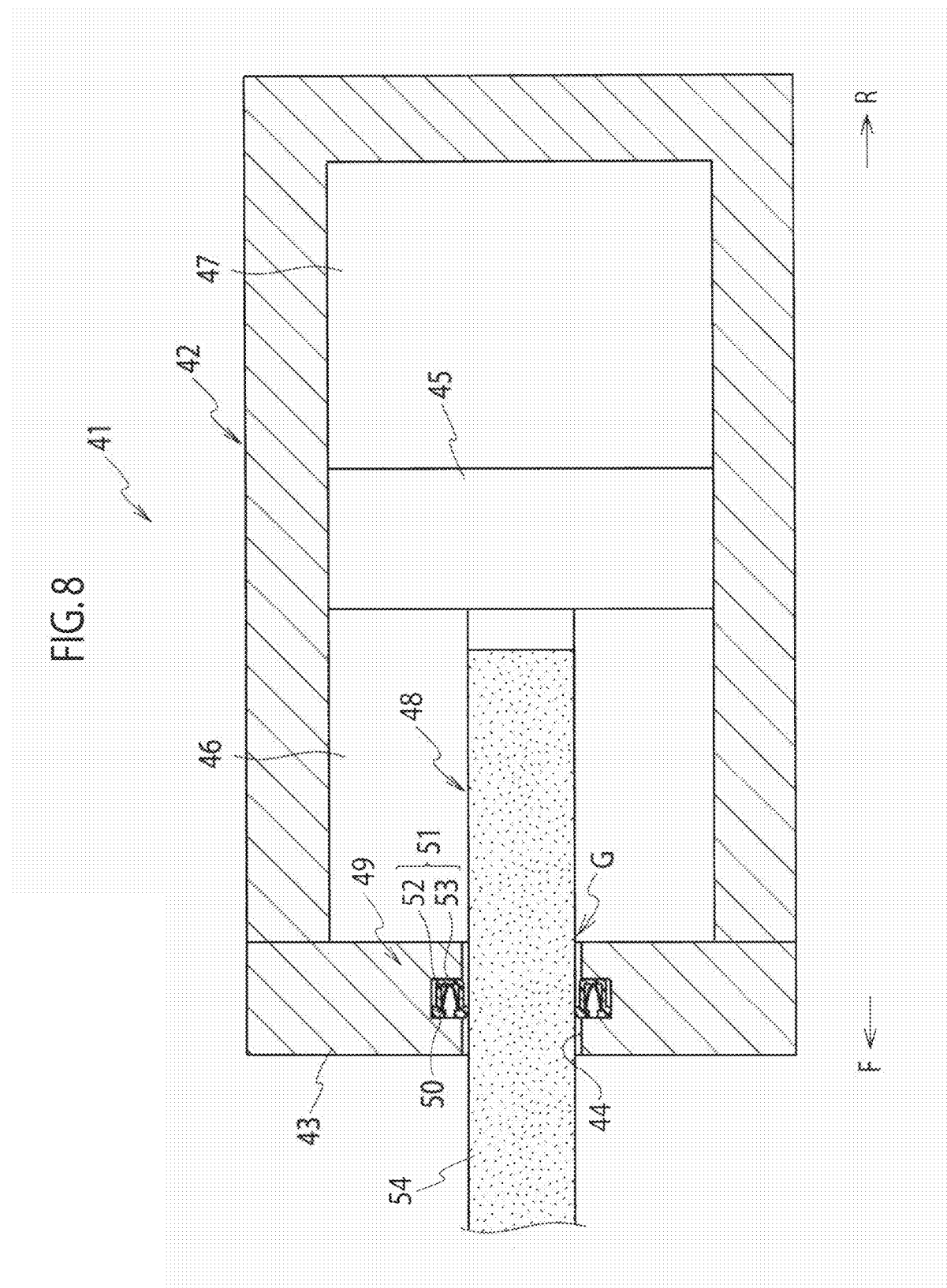
FIG. 8 is a cross-sectional view showing the hydraulic cylinder device of the third embodiment of the present invention.

As shown in FIGS. 7A and 7B, a hydraulic cylinder device (an example of the reciprocating machine) 41 of the third embodiment includes a cylindrical cylinder body 42 extending in the front-rear direction. The cylinder body 42 includes a cylinder head 43 in a front end side thereof. A through-hole 44 is formed in a center portion of the cylinder head 43. Moreover, a piston 45 is provided movably inside the cylinder body 42. The piston 45 partitions the inside of the cylinder body 42 into a first hydraulic chamber (front hydraulic chamber) 46 and a second hydraulic chamber (rear hydraulic chamber) 47.

In addition, a piston rod 48 is provided integrally with the piston 45, the piston rod 48 extending frontward from the front surface of the piston 45 and penetrating the through-hole 44 in the cylinder head 43. Thus, the first hydraulic chamber 46 in the cylinder body 42 is defined by the inner surface of the cylinder body 42, the inner surface of the cylinder head 43, the front surface of the piston 45, and the outer circumferential surface of the piston rod 48. The second hydraulic chamber 47 is defined by the inner surface of the cylinder body 42 and the rear surface of the piston 45.

The piston 45 and the piston rod 48 are provided to be movable relative to the cylinder body 42 and the cylinder head 43 in the axial direction.

The hydraulic cylinder device 41 configured as above moves the piston rod 48 and the piston 45 together frontward (in one direction) by discharging water from the first hydraulic chamber 46 and supplying water into the second hydraulic chamber 47. On the other hand, the hydraulic cylinder device 41 moves the piston rod 48 and the piston 45 together rearward (in the other direction) by discharging water from the second hydraulic chamber 47 and supplying water into the first hydraulic chamber 46.

The hydraulic cylinder device 41 of this embodiment includes a seal structure (cylinder device seal structure) 49 configured to seal a gap G between the through-hole 44 in the cylinder head 43 and the piston rod 48 to reduce the leakage of the water from the cylinder body 42.

As shown in FIG. 7A, the cylinder device seal structure 49 includes a packing 51 press-fitted in a circumferential groove 50 formed in the inner circumferential surface of the through-hole 44 in the cylinder head 43, and configured to seal the gap G between the cylinder head 43 and the piston rod 48.

The packing 51 includes an annular core 52 and a lip 53 provided integrally with the core 52 and being in sliding contact with the outer circumferential surface of the piston rod 48. The lip 53 is formed of a self-lubricating resin such as PTFE while the core 52 is formed of a metal such as stainless steel. Note that the packing 51 may be formed of a self-lubricating resin only.

The piston rod 48 includes: a resin layer 5 (see FIG. 1) formed by sliding the piston rod 48 on the lip 53 to transfer the resin forming the lip 53 onto a sliding contact portion of the outer circumferential surface of the piston rod 48 at which the piston rod 48 comes into sliding contact with the lip 53; and a resin layer holding structure 54 configured to hold the resin layer 5 in the sliding contact portion of the piston rod 48.

The resin layer holding structure 54 is a porous, hard film 54 formed by performing electric discharge surface treatment on the sliding contact portion of the outer circumferential surface of the piston rod 48 at which the piston rod 48 comes into sliding contact with the lip 53. More specifically, as shown in FIG. 7B, the hard film 54 is formed by causing pulse discharge using a plate-shaped discharge electrode 55 in an electrically insulative working liquid or in the air. The pulse discharge is caused between the discharge electrode 55 and the sliding contact portion of the outer circumferential surface of the piston rod 48, which is a component of the hydraulic cylinder device 41, while rotating the piston rod 48 about its axis 48s. By the discharge energy, the constituent material of the discharge electrode 55 or a substance obtained by reaction of the constituent material is deposited on the sliding contact portion of the outer circumferential surface of the piston rod 48. Meanwhile, the surface of the hard film 54 is subjected to polishing. Note that the discharge electrode 55 has the same configuration as the discharge electrode 34 of the second embodiment, and thus description thereof is omitted here.

Now, operations and effects of the third embodiment will be described.

The seal structure of the fluid device of this embodiment includes: the resin layer 5 formed by sliding the piston rod 48 on the lip 53 to transfer the resin forming the lip 53 onto the sliding contact portion of the outer circumferential surface of the piston rod 48 at which the piston rod 48 comes into sliding contact with the lip 53; and the resin layer holding structure 54 configured to hold the resin layer 5 in the sliding contact portion. Accordingly, like the first and second embodiments, at the frictional interface between the piston rod 48 and the lip 53, the resin layer 5 formed of the resin forming the lip 53 slides on the lip 53, and the two resins come into tight contact with each other. Thus, a large real contact area is maintained therebetween, improving the anti-leakage performance of the seal structure.

Moreover, the resin layer holding structure 54 is the porous hard film 54 formed by electric discharge surface treatment and, like the first and second embodiments, includes at its outermost surface relatively large island portions IL, a number of small particles S scattered therebetween, and a number of grooves or pores 6*a* formed therebetween (see FIGS. 1 and 3). Thus, when the resin layer 5 is formed by sliding the piston rod 48 on the lip 53 to transfer the resin forming the lip 53 onto the hard film 54, anchor portions 5*a* (see FIG. 1) of the resin layer 5 fitted in the grooves or pores 6*a* in the hard film 54 are formed at the interface with the hard film 54 of the resin layer 5. Because the small particles S defining the grooves or pores 6*a* in the hard film 54 have random polygonal shapes having a number of angular portions at the surfaces thereof, the small particles S penetrate the anchor portions 5*a*. This allows the resin layer 5 to be held securely and firmly in the sliding contact portion of the piston rod 48 by the hard film 54.

Further, in the seal structure of this embodiment, the discharge electrode 55 used in the electric discharge surface treatment may be molded out of a mixed powder in which at least one of powders of cBN, hBN, TiC, TiN, TiAlN, $TiB_2$, WC, $Cr_3C_2$, SiC, ZrC, VC, $B_4C$, $Si_3N_4$, $ZrO_2$, and $Al_2O_3$ is added to powder of the alloy which is the material of the discharge electrode 55. In this way, the wear resistance of the hard film 54 can be enhanced further. This makes it possible to improve the anti-leakage performance while securing a wear resistance that is substantially the same as those of films formed by some other, typical surface treatment methods.

Thus, according to the third embodiment, the anti-leakage performance of the cylinder device seal structure 49 is enhanced, making it possible to further improve the performance of the cylinder device seal structure 49.

Although embodiments of the present invention has been described above, these embodiments are merely examples described for the purpose of facilitating the understanding of the present invention, and the present invention is not limited to the embodiments. The technical scope of the present invention is not limited to the technical matters specifically disclosed in the embodiments, and includes various modifications, changes, alternative techniques which can be easily derived from the technical matters. For example, the seal structure 28 of the second embodiment can be used in a rotary machine other than the water pump 21. The seal structure 49 of the third embodiment can be used in a reciprocating machine other than the hydraulic cylinder device 41. Moreover, in the rotary machine of the second embodiment, the surface of the rotary shaft 24 which the lip 32 comes into sliding contact with is not limited to the outer circumferential surface parallel to the center axis of the rotary shaft 24, and may be the side surface (a flat surface perpendicular to the axial direction) of a flange projecting in the radial direction from the rotary shaft 24, or the side surface of a circular cone diverging toward the one end side in the axial direction. Furthermore, the cross-sectional shape of the piston rod 48 in the cylinder device of the third embodiment is not limited to a circular shape, and may be an elliptical shape, an oblong shape, or a polygonal shape with rounded corners.

This application is a Divisional Application of U.S. application Ser. No. 13/509,503, filed May 11, 2012, which claims priority based on Japanese Patent Application No. 2009-260169, filed Nov. 13, 2009, the entire contents of each of which are incorporated herein by reference.

INDUSTRIAL APPLICABILITY

According to the present invention, it is possible to improve the anti-leakage performances of seal structures of fluid devices. Accordingly, the present invention can be preferably utilized in many applications such as fluid machines that handle a fluid such as liquid, gas, or gas-liquid multiphase fluid, and devices such as valves that control a fluid flow.

REFERENCE SIGNS LIST

G gap
1 fluid device
1*a* internal area
2 fixed member (first member)
3 movable member (second member)
3*a* surface
3*b* sliding contact portion
4 seal member
4*a* sliding contact member
5 resin layer
5*a* anchor portion
6 film (resin layer holding structure)
6*a* groove or pore
7 discharge electrode
21 water pump
21*a* pump chamber
22 housing
23 through-hole
24 rotary shaft
24*s* axis
26 bearing
27 impeller
28 rotary machine seal structure
29 packing
30 packing gland
31 core
32 lip
33 hard film (resin layer holding structure)
34 discharge electrode
41 hydraulic cylinder device
42 cylinder body
43 cylinder head
44 through-hole
45 piston
46 first hydraulic chamber
47 second hydraulic chamber
48 piston rod
48*s* axis
49 cylinder device seal structure
50 circumferential groove
51 packing
52 core
53 lip
54 hard film (resin layer holding structure)
55 discharge electrode

The invention claimed is:

1. A method for sealing a fluid device comprising:
   providing a first member for defining a hollow internal area of a fluid device;
   providing a second member for defining the internal area together with the first member such that the second member is movable relative to the first member;
   providing a seal member for sealing a gap between the first member and the second member, wherein the seal member is fixed to the first member and has a sliding contact member formed of a resin and being in sliding contact with a sliding contact portion of the second member;
   forming a porous film in the sliding contact portion by depositing, by electric discharge between the sliding contact portion and a discharge electrode, an electrode material of the discharge electrode or a substance as a result of a reaction of the electrode material under action of the electric discharge energy on the sliding contact portion; and
   forming a resin layer on the porous film by sliding the second member on the sliding contact member in operation of the fluid device, thereby transferring a portion of the resin from the sliding contact member to the porous film to supply the pores of the porous film with the portion of the resin.

2. The method for sealing a fluid device according to claim 1, wherein
   the fluid device is a rotary machine,
   the first member is a housing of the rotary machine,
   the second member is a rotary shaft projecting from a through-hole provided in the housing,
   the seal member is a packing configured to seal a gap between the housing and the rotary shaft,
   the sliding contact member is an annular lip in sliding contact with an outer circumferential surface of the rotary shaft, and
   the resin layer and the porous film are formed in a sliding contact portion of the outer circumferential surface of the rotary shaft at which the rotary shaft comes into sliding contact with the lip.

3. The method for sealing a fluid device according to claim 2, wherein
   the packing includes an annular core formed of a metal, and
   the lip is provided integrally with the core.

4. The method for sealing a fluid device according to claim 1, wherein
   the fluid device is a cylinder device,
   the first member is a cylinder body of the cylinder device,
   the second member is a piston rod projecting from a through-hole provided in the cylinder body,
   the seal member is a packing configured to seal a gap between the cylinder body and the piston rod,
   the sliding contact member is an annular lip in sliding contact with an outer circumferential surface of the piston rod, and
   the resin layer and the resin layer holding structure are formed in a sliding contact portion of the outer circumferential surface of the piston rod at which the piston rod comes into sliding contact with the lip.

5. The method for sealing a fluid device according to claim 4, wherein
   the packing includes an annular core formed of a metal, and
   the lip is provided integrally with the core.

6. The method for sealing a fluid device according to claim 1, wherein the resin is a self-lubricating resin.

7. The method for sealing a fluid device according to claim 1, wherein the discharge electrode is a molded article made of any one of a metal powder, a metal compound powder, a ceramic powder, and a mixed powder thereof.

* * * * *